(12) United States Patent
Zavrel et al.

(10) Patent No.: US 9,549,567 B2
(45) Date of Patent: Jan. 24, 2017

(54) METHOD FOR OBTAINING AROMATICS

(71) Applicant: CLARIANT INTERNATIONAL LTD., Muttenz (CH)

(72) Inventors: Michael Zavrel, Olching (DE); Danielle Dennewald, Munich (DE); Sandra Schuetze, Gmund am Tegernsee (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/655,821

(22) PCT Filed: Dec. 23, 2013

(86) PCT No.: PCT/EP2013/077899
§ 371 (c)(1),
(2) Date: Jun. 26, 2015

(87) PCT Pub. No.: WO2014/102238
PCT Pub. Date: Jul. 3, 2014

(65) Prior Publication Data
US 2016/0007640 A1    Jan. 14, 2016

(30) Foreign Application Priority Data

Dec. 28, 2012  (EP) .................... 12199726

(51) Int. Cl.
| | |
|---|---|
| *A23L 1/221* | (2006.01) |
| *B01D 53/04* | (2006.01) |
| *C11B 9/02* | (2006.01) |
| *B01D 53/02* | (2006.01) |

(52) U.S. Cl.
CPC ............ *A23L 1/2217* (2013.01); *A23L 27/115* (2016.08); *A23L 27/12* (2016.08); *A23L 27/13* (2016.08); *B01D 53/04* (2013.01); *C11B 9/027* (2013.01); *A23V 2002/00* (2013.01); *B01D 53/02* (2013.01); *B01D 2253/108* (2013.01); *B01D 2253/308* (2013.01)

(58) Field of Classification Search
CPC ............ B01D 2253/1085; B01D 53/04; A23L 27/115; A23L 27/12
USPC ....... 426/590, 650, 651, 386, 387, 475, 492, 426/493, 494
See application file for complete search history.

(56) References Cited

U.S. PATENT DOCUMENTS

| | | | | |
|---|---|---|---|---|
| 3,477,856 A | * | 11/1969 | Schultz | .................. A23F 5/483 426/424 |
| 4,343,623 A | | 8/1982 | Kulprathipanja et al. | |
| 4,487,614 A | | 12/1984 | Yon | |
| 4,970,085 A | * | 11/1990 | Persson | ................. A23L 1/2225 426/330.5 |
| 5,073,398 A | * | 12/1991 | Kuss | ....................... A23D 9/00 426/387 |
| 5,256,173 A | * | 10/1993 | Rastelli | ................. B01D 53/02 568/917 |
| 5,271,914 A | | 12/1993 | Sugimoto et al. | |
| 5,910,292 A | | 6/1999 | Alvarez, Jr. et al. | |
| 6,099,619 A | | 8/2000 | Lansbarkis et al. | |
| 6,402,813 B2 | | 6/2002 | Monereau et al. | |

FOREIGN PATENT DOCUMENTS

| | | |
|---|---|---|
| EP | 1916294 B1 | 4/2008 |
| EP | 2168656 A1 | 3/2010 |
| EP | 2468874 A1 | 6/2012 |
| EP | 2532411 A1 | 12/2012 |

* cited by examiner

*Primary Examiner* — Helen F Heggestad
(74) *Attorney, Agent, or Firm* — Gianna Julian-Arnold; Saul Ewing LLP

(57) ABSTRACT

The invention relates to a method for obtaining aromatics.

13 Claims, No Drawings

_(1)_

METHOD FOR OBTAINING AROMATICS

CROSS REFERENCE TO RELATED APPLICATIONS

This application claims the priority of PCT/EP2013/077899, filed on 23 Dec. 2013, which claims priority to European Patent Application No, 12199726.6, filed 28 Dec. 2012, the entire contents of each of which are hereby incorporated in total by reference.

The present invention relates to a method for obtaining flavorings.

Flavorings are frequently used primarily in the food industry in order to change the sensory quality of products. In this case, an annually increasing demand, in particular for natural flavorings is measured, since consumers are reacting increasingly critically to the use of artificial flavorings. Natural flavorings are extracted, for example from plant raw materials, using organic solvents such as alcohols or ketones. Such methods are widely known in the prior art.

It is disadvantageous in the case of these methods that, firstly, the solvents used for the extraction represent additional costs, and, in addition, they must be separated off from the extract by energy-consuming distillation or evaporation before addition of the flavorings.

A further method for obtaining natural flavorings which succeeds without the use of organic solvents is described in EP 1 916 294. In this case, a plant starting material is placed under vacuum and heated to a temperature which is above the boiling point of water. The flavorings are extracted from the starting material together with the water that is transferred to the gas phase.

This method, on account of the steps that are complex in processing terms, is a problem industrially from economic aspects. In addition, a large amount of water is co-separated off, which must be separated in a complex manner before use of the flavorings.

The inventors of the present invention have therefore addressed the problem of developing a method which does not have the disadvantages that are known in the prior art and enables in particular natural flavorings to be obtained, which are added in a simple manner to desired products, or, after separating off unwanted components from the flavorings, can be added back to the starting materials.

It has now surprisingly been found that this problem can be solved by a method in which the flavorings are obtained from a gaseous composition comprising at least one flavoring, which comprises the step (A1) contacting a gaseous composition containing at least one flavoring with an adsorber, wherein the adsorber comprises a molecular sieve having a pore diameter of at most 8 Å.

The expression "obtaining" in the context of the present invention is taken to mean the acquisition of at least one flavoring which after the method according to the invention has been carded out is present in the gaseous composition in purer form than originally used and/or which, after the method according to the invention has been carried out, has an increased availability.

The expression "contacting", in the context of step (A1) of the method according to the invention, is taken to mean any type of contacting which appears suitable for the purpose according to the invention to a person skilled in the art, Preferably, the contacting in the context of step (A1) is performed by passing the gaseous composition through one (or more) column(s) containing the adsorber. Preferably, a plurality, particularly preferably 2 to 6, columns are used. These columns can be series- or parallei-connected.

In this case the columns can contain the same or different adsorber materials, The fraction of the molecular sieve having a pore diameter of at most 8 Å, in the context of a preferred embodiment, is at least 10% by weight, based on the total weight of the adsorber, preferably at least 25% by weight, further preferably at least 50% by weight, particularly preferably at least 75% by weight, in particular at least 90% by weight, and most preferably at least 95% by weight. In this case, it is likewise particularly preferred that the fraction of the molecular sieve having a pore diameter of at most 8 Å (or at most 7.5 Å, at most 7 Å, at most 6.5 Å, respectively in the ranges of pore diameter cited successively as particularly preferred) is at least 90% by weight, preferably at least 95% by weight, particularly preferably 100% by weight, based on the total weight of the adsorber. In addition, it is preferred when the fraction of the molecular sieve having a pore diameter of at most 8 Å (or at most 7.5 Å, at most 7 Å, at most 6.5 Å, respectively in the ranges of pore diameter cited successively as particularly preferred) is selected in the range from 25 to 100% by weight, based on the total weight of the adsorber, preferably in the range from 50 to 100% by weight, further preferably in the range from 75 to 100% by weight, and most preferably in the range from 90 to 100% by weight, based on the total weight of the adsorber.

In a further preferred embodiment, the mass ratio of the molecular sieve having a pore diameter of at most 8 Å to adsorbed compounds is preferably in the range from 1 to 1000, further preferably from 2 to 500, particularly preferably from 3 to 200, likewise particularly preferably from 4 to 100, and most preferably in the range from 5 to 50. This applies, in particular, when short-chain alcohols are present among the adsorbed compounds. The expression "short-chain alcohol", in the context of the present invention, is taken to mean any alcohol which has 1 to 3 carbon atoms, for example methanol or ethanol, and is volatile.

The expression "molecular sieve", in the context of the method according to the invention, is taken to mean a material which has a high adsorption capacity for gases and vapors of defined molecular sizes, By suitable choice of the molecular sieve, it is possible to separate molecules of different sizes. In a preferred embodiment, the molecular sieve is a molecular sieve which at a temperature of 40° C. and a pressure of 1.013 bar absolute binds at least two times the mass, preferably 2.5 times the mass, and particularly preferably three times the mass, of short-chain alcohols in comparison with water from an aqueous alcoholic solution, when the aqueous alcoholic solution is an aqueous solution of at least 50 g/l of short-chain alcohols, Preferably, a gaseous mixture consisting of short-chain alcohols and water is generated from the aqueous alcoholic solution by stripping or evaporation. It is particularly preferred in this case that at least 50% of the short-chain alcohols present in the aqueous alcoholic solution can be bound to the molecular sieve. These properties of the molecular sieve can be determined is by stripping 500 ml of an aqueous alcoholic solution containing at least 50 g/l of the short-chain alcohol for 24 hours at a pressure of 1.013 bar and a temperature of 30° C. with 1 l of inert gas volume per minute and passing the gas stream enriched with the short-chain alcohol through a column which is packed with 200 g of the molecular sieve. The gas stream that is depleted in the short-chain alcohol is recirculated, By determining the weight of the molecular sieve before and after the experiment, the total mass taken up is determined, The fraction of water can be determined by Karl-Fischer titration. The remainder of the bound mass is due to the adsorbed short-chain alcohol. Preferably, an aqueous alcoholic solution consisting of 50 g/l of ethanol in water is used.

In a particularly preferred embodiment, the molecular sieve comprises at least one zeolite having a molar $SiO_2/Al_2O_3$ ratio of at least 50, preferably at least 150, further preferably at least 300, particularly preferably at least 600, especially preferably at least 900, and most preferably at least 1200. Furthermore, it is preferred when the molar $SiO_2/Al_2O_3$ ratio of the zeolite is selected in the range 50 to 1200, preferably 100 to 1200, further preferably 300 to 1200, and most preferably 600 to 1200. The fraction of the zeolite of the molecular sieve in the context of a preferred embodiment is at least 10% by weight, based on the total weight of the molecular sieve, preferably at least 25% by weight, further preferably at least 50% by weight, particularly preferably at least 75% by weight, in particular at least 90% by weight, and most preferably at least 95% by weight. In this case it is likewise particularly preferred that the fraction of the zeolite is 100% by weight, based on the total weight of the adsorber. In addition it is preferred when the fraction of the zeolite of the molecular sieve is selected in the range from 25 to 100% by weight based on the total weight of the molecular sieve, preferably in the range from 50 to 100% by weight, further preferably in the range from 75 to 100% by weight, and most preferably in the range from 90 to 100% by weight.

Particular preference is given to zeolites of the beta or MFI type.

Further possible components of the adsorber can be selected in the context of the present invention from the group consisting of silica, bentonites, silicalites, clays, hydrotalcites, aluminosilicates, oxide powders, mica, glasses, aluminates, clinoptolites, gismondines, quartzes, activated carbons, bone carbons, montmorillonites, polystyrenes, polyurethanes, polyacrylamides, polymethacrylates or polyvinylpyridines.

The expression "gaseous composition", in the context of the present invention, is preferably air or one or more individual components of air, such as nitrogen, carbon dioxide and/or oxygen. Equally preferably, the gaseous composition is fermentation gases wherein these are distinguished, for example, by a carbon dioxide fraction increased with respect to air. In the case of an aerobic fermentation, it is possible in this case that the fermentation gas has a carbon dioxide fraction increased by at least 2% by volume in comparison with air, and in the case of an anaerobic fermentation, it is possible in this case that the volume fraction of carbon dioxide is at least 90% by volume, Fermentation gas(es) as gaseous composition is preferred, in particular in the case that the liquid cited in step (A0) is a fermented liquid, wherein it is particularly preferred that the gaseous composition is the fermentation gas which is formed during fermentation of the liquid cited in step (A0), if as liquid, a fermented liquid is selected. In this case, the selection of fermentation gas as gaseous composition is particularly advantageous, since no additional costs and process steps occur in order to provide the gaseous composition. A composition, in the context of the present invention, is termed "gaseous" when the particles thereof move freely at a great distance from one another and uniformly fill up the available space, In comparison with the solid or liquid state of matter, the same mass in the gaseous state occupies around 1000 to 2000 times the volume under standard conditions.

The expression "flavoring", in the context of the present invention, is taken to mean chemically defined substances having flavoring properties, In particular, the expression "flavoring" in the context of the present invention designates volatile compounds for use in foods which are perceived with the olfactory receptors, either directly via the nose or via the pharynx. Flavorings can be, for example, alcohols, aldehydes, ketones, esters, lactones, sulfides and heterocycles (e.g. furan compounds, pyrazines, thiazoles and thiophenes), Flavorings currently permitted for use in foods in the European Union, as are likewise subsumed in the context of the present invention under the expression "flavoring", are, for example, referred to in the flavorings regulation (Article 22 d, Regulation on revision of legal requirements for food labeling) (§1(1) Definition) and are listed in the decision of the commission of the European communities on 23 Feb. 1999 (official journal of the European communities of 27 Mar. 1999, DE, L 84/1) and the implementation regulation (EU) number 872/2012 of the commission of 1 Oct. 2012 (official journal of the European communities of 2 Oct. 2012, DE., L 267/1). The content of these documents is hereby incorporated by reference in the disclosure of the present. application.

In general, flavorings may be subdivided into two sub-categories:

Synthetic flavorings are formed by synthetic methods. Such flavorings are either nature-identical flavorings or artificial flavorings. The nature-identical flavorings follow an example in nature and correspond in the molecular structure thereof to precisely this example, e.g. synthetically produced vanillin. Artificial flavorings, in contrast, have no example in nature.

Natural flavorings are flavorings which are obtained by physical (e.g. distillation and extraction), enzymatic or microbiological methods. Starting materials for the production can be of plant, animal or microbiological (e.g. yeasts) origin.

The method according to the invention is particularly suitable for obtaining natural flavorings which, according to a preferred embodiment, originate from plant raw materials by extraction or fermentation.

The expression "pore diameter" is taken to mean the maximum diameter of a theoretical sphere which can be embedded in the micropores of the molecular sieve.

The expression "molecular diameter" is taken to mean the diameter of the maximum projected diameter of a molecule.

In this case, in the context of the present invention, it is particularly preferred when the pore diameter of the molecular sieve is at most 8 Å, preferably at most 7.5 Å, further preferably at most 7 Å, and most preferably at most 6.5 Å. It is particularly preferred when the pore diameter of the molecular sieve is selected in a range which is below the molecular diameter of the flavorings present in the gaseous composition, wherein it is particularly preferred that at least 90% by weight (based on the total weight of the flavorings present in the gaseous composition) of the flavorings present in the gaseous composition have a molecular diameter which is greater than the pore diameter of the molecular sieve, more preferably at least 95% by weight, further preferably at least 97% by weight, particularly preferably at least 98% by weight, equally preferably at least 99% by weight, and most preferably 100% by weight. In a further preferred embodiment, the pore diameter of the molecular sieve is selected in the range from 5 to 8 Å, more preferably 5.5 to 7 Å, further preferably 6 to 6.5 Å. Likewise preference is given to a range from 5 to 6.5 Å. In this case it is particularly preferred to select the pore diameter of the molecular sieve in a range from 5 to 8 Å, preferably 5.5 to 7 Å, when at least 90% by weight, preferably at least 95% by weight, particular/yr preferably at least 97% by weight, and most preferably at least 99% by weight of the flavorings present in the gaseous composition have a molecular diameter from 8 to 18 Å or 9 to 16 Å. The method according to the invention is suitable in particular for obtaining flavorings which are present in a liquid. Accordingly, the method according to the invention, in a preferred embodiment, additionally comprises the step (A0) enriching a gaseous composition with at least one flavoring by contacting the gaseous composition with a liquid containing the at least one flavoring.

The contacting according to step (A0) proceeds before the contacting according to step (A1), The contacting according to step (A0) can proceed in any manner which is known to be suitable to a person skilled in the art for the method according to the invention. Preferably, the contacting according to step (A0) proceeds by passing the gaseous composition through the liquid, particular preference in this case is given to the method known to those skilled in the art of gas stripping, or by pervaporation. Gas stripping is carried out preferably at a pressure between 0.1 and 2 bar, particularly preferably between 0.5 and 1.1 bar. Particular preference is given to stripping at reduced pressure.

In order to achieve efficient gas stripping, the gas bubbles are preferably dispersed. This can be performed using an agitator which is arranged in such a manner that fine bubbles of the carrier gas are formed.

In addition, it is preferred to carry out the contacting in a column in which a large mass transfer area is achieved by suitable internals or packings. Particularly preferably, in this case liquid and gas stream move in counterflow to one another, that is in opposite directions.

The liquid cited in step (A0) is, according to a preferred embodiment of the present invention, a liquid of plant origin, wherein any liquid of plant origin can be used which is known to be suitable to those skilled in the art for the method according to the invention, In a preferred embodiment, the liquid of plant origin is an extract which has been formed for example by pressing plant raw material, or else by contacting plant raw material with at least one extraction medium such as an organic solvent (for example alcohol(s) or ketones) or an aqueous extraction medium. It is likewise possible that before, during or after the extraction or the pressing, at least one enzyme or an enzyme mixture is added to the plant-origin material.

In a particularly preferred embodiment, the liquid is a pressing or an extract from apple, pear, orange, mango, cherry, blueberry, *Ribes* currant, passionfruit, lychee, guava, strawberry, raspberry, blackberry, gooseberry, tomato, mirabelle, apricot, peach, grape, melon, plum, damson, carrot and/or sloe. It is likewise possible in the context of the present invention that the plant raw material is a material which contains starch, cellulose, hemicellulose and/or lignin, in addition, it is possible that the plant raw material is parts of medicinal plants, healing plants, tealeaves, berries, seeds, herbs, spices or spice herbs, such as, for example, juniper, laurel, cinnamon, vanilla, peppermint, sage, arnica, eucalyptus, black tea, green tea, hops, aniseed, lavender, blackberry leaves, chamomile, lemon grass, fennel, cloves, lemon balm, cocoa, pepper, red bush, lime blossom, rosehip, hibiscus, nettle, elderflower, elderberry, rose, maté or nutmeg.

Mixtures of all of the abovementioned plant raw materials are also suitable in the context of the present invention.

It is likewise particularly preferred when the liquid cited in step (A0) is a fermented liquid. Particularly suitable fermented liquids are fermentation liquids which are formed by fermentation of a suitable fermentation medium which contains a carbon source (e.g. glucose) and optionally a nitrogen source (e.g. ammonia), with, for example, one or more yeasts, bacteria or fungi. Particularly preferably, the yeasts are *Saccharomyces cerevisiae,* or microorganisms having similar fermentation properties such as, for example, *Pichia Pichia segobiensis, Candida shehatae, Candida tropicalis, Candida Candida tennis, Pachysolen tannophilus, Hansenula polymorpha, Candida famata, Candida parapsilosis, Candida rugosa, Candida sonorensis, Issatchenkia terricola, Kloeckera apis, Pichia barkeri, Pichia cactophila, Pichia deserticola, Pichia norvegensis, Pichia membranaefaciens, Pichia mexicana, Torulaspora, delbrueckii, Candida bovina, Candida picachoensis, Candida emberorum, Candida pintolopesii, Candida thermophila, Kluyveromyces marxianus, Kluveromyces fragilis, Kazachstania telluris, Issatchenkia orientalis, Lachancea thermotolerans, Clostridium thermocellum, Clostridium thermoacetoci, Clostridium thermosaccharolyticum, Thermoanaembium brockli, Thermobacteroides acetoethylicus, Thermoanaerobacter ethanolicus, Clostridium thermoaceticum, Clostridium thermoautotrophicum, Acetogenium kivui, Desulfotomaeulum nigrificans* and *Desulfovibrio thermophilus, Thermoanaerobacter tengcongensis, Bacillus stearothermophilus* and *Thermoanaerobacter mathranii.* Suitable fermentation media are media based on water that contain plant raw material or consist thereof. As plant raw material, in the context of the present invention, preferably one or more fruits or vegetables are used, wherein apple, pear, orange, mango, cherry, blueberry, *Ribes* currant, passionfruit, lychee, guava, strawberry, raspberry, blackberry, gooseberry, tomato, mirabelle, apricot, peach, pomegranate, coconut, grape, melon, plum, damson, carrot and/or sloe are particularly preferred. Particularly preferably, in the context of the present invention, a liquid is used which is formed by pressing and subsequent fermentation of one or more of the abovementioned fruits or vegetables. It is particularly preferred when the liquid cited in step (A0) is fruit juice. The expression "fruit juice", in the context of the present invention, is taken to mean a liquid product obtained from fruit of one or more fruit species. The name "fruit juice" comprises, in the context of the present invention, direct juice and fruit juice from fruit juice concentrate. In the case of the latter, fruit juice is concentrated, for example in the land of origin, and rediluted in the target country, in order to spare transport costs, Equally suitable, in the context of the present invention, however, are also fruit nectars and fruit juice drinks, in which further ingredients can be added.

One advantage of this embodiment of the method according to the invention is that the carbon dioxide that is formed during a fermentation can be used directly as gaseous composition according to step (A0).

The fermentation preferably proceeds in a stirred tank reactor or in a loop reactor or in an air-lift reactor. In addition, the gas transfer is also possible via an external gas-stripping column connected to the fermenter, which column is continuously fed with the fermentation solution and the discharge thereof is fed back into the fermenter. Particularly preferably, such an external gas-stripping column is operated in counterflow and/or in combination with packings for increased mass transfer, such as, e.g., Raschig rings.

The specific gas-introduction rate is preferably between 0.1 and 10 wm, particularly preferably between 0.5 and 5 wm.

However, it is likewise possible in the context of the present invention to use any type of liquid or mixtures of two or more liquids which contain at least one flavoring, these liquids can consist, for example, of aqueous or solvent-containing extracts of plant-origin material, or comprise this, such as, for example, an alcoholic extract (preferably by addition of at least one alcohol) of one or more of the abovementioned fruits, medicinal plants, healing plants, spices or vegetables. The extraction of raw materials of plant origin is within the scope of the knowledge of a person skilled in the art.

The method according to the invention is particularly advantageous when the liquid according to step (A0) is a liquid that contains at least one short-chain alcohol such as, for example, a liquid fermented by yeast(s), or an alcoholic extract. If the method according to the invention is carried out using such liquids, in the context of step (A1) of the method according to the invention, a majority of the short-chain alcohols present in the liquid can be removed. In a particularly preferred embodiment, in this case, at least 50% of the short-chain alcohols present in the liquid are bound to the adsorber, more preferably at least 70%, further preferably at least 80%, in particular at least 90%, likewise preferably at least 95%, and most preferably 99%. it is likewise preferred when, in the context of the method according to the invention, all of the short-chain alcohols present in the liquid are removed.

The method according to the invention in addition offers the advantage that molecules bound to the adsorber can be separated off and recovered in a simple and economically expedient manner. If at least one short-chain alcohol is present in the liquid cited in step (A0), the method according to the invention can therefore be used in a particularly advantageous manner for obtaining the at least one short-chain alcohol. Preferably, the molecule/molecules bound to the adsorber are recovered by desorption.

It is possible in particular to carry out a selective desorption of the molecule/molecules bound to the adsorber such as, for example, a short-chain alcohol, from the adsorbent by increasing the temperature and/or reducing the pressure within the column. In a preferred embodiment of the method, the thermal energy is introduced directly onto the adsorbent packing via the column wall and optionally in addition via the heating coils in the interior of the column. Preference is given to temperatures between 25 and 300°C., and absolute pressures between 0 and 10 bar. Particular preference is given to temperatures between 40 and 180° C., and also absolute pressures of reduced pressure, preferably between 0.01 and 1 bar.

Preferably, for discharge of the desorbed molecule/molecules from the column, a carrier gas is used. It is possible to use the same inert carrier gas which is also used in the context of step (A0) of the method according to the invention. Likewise preferably, the temperature and the absolute pressure of the carrier gas are set in accordance with the abovedescribed temperatures and absolute pressures within the column. For this purpose, upstream heat exchangers and/or throttles and/or compressors are suitable.

The desorption can be carried out in a fluidized bed operation.

In addition, the desorption can proceed
(a) by displacement by means of other components;
(b) thermally, i.e. by increasing the temperature of the adsorbent (temperature-swing-adsorption (TSA) method);
(c) by what is termed pressure-swing adsorption (PSA) method, i.e. by lowering the pressure;
(d) by a combination of the methods cited in (a) to (c).

Likewise preferably, in the desorption, a purge gas can be used. Preferred purge gases are inert gases, particular preference is given to the purge gases air, carbon dioxide, nitrogen, noble gases, or mixtures thereof. It is additionally possible that the purge gas contains water. Particularly preferably, the temperature of the purge gas is above the temperature of the composite material. In addition, preferably, the direction of flow in the desorption is in the opposite direction to the direction of flow of the fluid in the adsorption, that is to say such that the desorption proceeds against the concentration gradient of the organic components adsorbed to the composite material during the adsorption.

The method according to the invention, particularly preferably, is further suitable in order to transfer the flavorings obtained according to step (A1) of the method to products, in particular fluid products, such as liquids, for example. Therefore, the method according to the invention, in a further preferred embodiment, comprises the step.
(A2) contacting the gaseous composition according to step (A1) with a liquid.

The contacting according to step (A2) proceeds after the contacting according to step (A1), The contacting according to step (A2) can proceed in any manner which is known to those skilled in the art as suitable for the method according to the invention. Preferably, the contacting according to step (A2) proceeds by passing the gaseous composition through the liquid. The passing through proceeds in this case preferably in counterflow.

The method according to the invention thereby permits flavorings to he obtained which can be used in a simple and economically rational manner, for example in food products.

In the context of a particularly preferred embodiment, the liquid cited in step (A2) is a liquid as has been defined above. In this case, it is possible, in particular in the context of the present invention, that the liquids cited in step (A0) and (A2) are different liquids or the same liquid.

The method according to the invention therefore also permits the concentration or depletion of individual flavorings and/or key flavorings within a liquid type. For example, by combining steps (A0), (A1) and (A2) of a first batch of orange juice by corresponding selection of the molecular sieve, certain flavorings can be withdrawn and the flavorings thus obtained can be added to a further batch of orange juice (direct juice, or juice from orange juice concentrate) or direct orange juice concentrate. Flavor blending is equally possible, that is to say flavorings which are specifically withdrawn from one type of liquid can be fed to a second type of liquid, A further advantage of the method according to the invention is that—if the liquid containing the at least one flavoring is, for example, a fermented fruit juice—by selecting the pore size of the adsorber of at most 8 Å, preferably in the range from 5 to 8 Å, particularly preferably in the range from 5 to 6.5 Å, firstly the alcohol present in the fermented liquid, which is predominantly ethanol and methanol, can be separated off by adsorption to the adsorber, but at the same time important key flavors of the fruit juice remain in the gaseous composition and can be added either directly back to the same or to a further liquid. In the event that the fermented liquid is fermented orange juice (direct juice or juice from orange juice concentrate) or orange juice concentrate, the method according to the invention is particularly advantageous in order to obtain the key flavors of orange juice comprising (S)-ethyl-2-methylbutanoate, ethylbutanoate, (Z)-3-hexenal, ethyl 2-methylpropanoate, (R)-limonene, (R)-α-pinene, myrcene, tr-4,5-epoxy-(E)-2-decenal, hexanal, ethyl hexanoate and linalool. If the fermented liquid is fermented apple juice (direct juice or juice from apple juice concentrate) or is apple juice concentrate, the method according to the invention is particularly advantageous in order to obtain the key flavors of apple juice comprising ethyl isobutyrate, ethyl butyrate, methyl 2-methylbutyrate, methyl hexanoate, ethyl caproate, hexyl acetate, hexyl 2-methylbutyrate and hexanal.

In addition, it is possible to condense the flavorings obtained by the method according to the invention. The condensation can proceed in this case in any manner which is known to those skilled in the art as suitable for the purpose according to the invention, preferably the condensation proceeds by cooling the gaseous composition which contains the at least one flavoring.

It is likewise possible to add the flavorings obtained by the method according to the invention in condensed form to a desired product.

In addition, the method according to the invention therefore, in a preferred optional embodiment, comprises the step.

(A1a) condensing the gaseous composition containing the at least one flavoring before the contacting with a liquid according to step (A2).

The condensing according to step (A1a) proceeds in this case after step (A1) of the method according to the invention.

In addition, in the context of the method according to the invention, it is preferred if the step (A0), (A1), (A1a) and/or (A2) is repeated at least once, It is particularly preferred in this case when at least step (A0) and (A1) are repeated once or several times.

It is possible in the context of the present invention that all of the described preferred embodiments can be combined with one another.

Hereinafter, preferred embodiments of the method according to the invention are described which, however, in no way restrict the scope of the present application, but are merely intended to explain further the particular advantages of the method according to the invention.

Therefore, the present invention, in a preferred embodiment, comprises a method for obtaining flavorings which are present in at least one liquid, which comprises the steps (A0) enriching a gaseous composition with at least one flavoring by contacting the gaseous composition with a liquid containing the at least one flavoring;

(A1) contacting the gaseous composition containing at least one flavoring according to step (A0) with an adsorber, wherein the adsorber comprises a molecular sieve having a pore diameter of at most 8 Å.

In addition, the present invention, in a preferred embodiment, comprises a method for obtaining flavorings which are present in at least one liquid, which comprises the steps (A0) enriching a gaseous composition with at least one flavoring by contacting the gaseous composition with a liquid containing the at least one flavoring;

(A1) contacting the gaseous composition containing at least one flavoring according to step (A0) with an adsorber, wherein the adsorber comprises a molecular sieve having a pore diameter of at most 8 Å, wherein it is particularly preferred when the adsorber is a zeolite and/or it is further preferred if the liquid is a liquid of plant origin and/or the contacting according to step (A0) is performed by passing the gaseous composition through the liquid, particularly preferably by gas stripping or pervaporation. It is particularly preferred when the liquid is a fermented liquid or a liquid of plant origin generated by alcoholic extraction. In this case, it is in addition particularly preferred when the liquid is fermented orange juice (direct juice or juice from orange juice concentrate) or fermented orange juice concentrate.

It is likewise particularly preferred in the context of the present invention when the at least one flavoring obtained by the abovedescribed method is added in a simple manner to a desired end product, for example a food product, Accordingly, the method described, in a further particularly preferred embodiment, comprises the step (A2) contacting the gaseous composition according to step (A1) with a liquid wherein the liquid cited in step (A2) is preferably fruit juice.

If the steps (A0), (A1) and (A2) are carried out consecutively proceeding from a fermented liquid of plant origin, and if the liquid cited in step (A0) and step (A2) is the same liquid, it is possible, firstly to deplete short-chain alcohols from the fermented liquid, by binding them to the adsorber, and secondly to return the flavorings discharged with gaseous composition from the liquid in step (A0) back to the liquid after depletion of the short-chain alcohols. As end product, by this adaptation of the method according to the invention, for example a fruit juice can be obtained which differs from the original product obtained by pressing by a reduced content of sugars, but no adverse effects in the content of flavorings.

In addition, the method according to the invention is suitable for depletion of sugar with simultaneously substantial retention of the taste and flavor properties of a liquid which contains sugar and flavorings, wherein such a method preferably comprises the steps:

(Z1) fermentation of some or all of the sugar present in the liquid to form short-chain alcohols by means of microorganisms, preferably by addition of *Saccharomyces cerevisiae* and subsequent incubation, (A0) enriching a gaseous composition with at least one flavoring by contacting the gaseous composition with the fermented liquid according to step (Z1), (A1) contacting the gaseous composition containing short-chain alcohols and at least one flavoring according to step (A0) with an adsorber, wherein the adsorber comprises a molecular sieve having a pore diameter of at most 8 Å, (A1.1) selective adsorption to the adsorber of short-chain alcohols present in the gaseous composition and (A2) contacting the gaseous composition with the fermented liquid according to step (Z1), wherein it is preferred in particular, if the adsorber is a zeolite and/or it is further preferred if the liquid is a liquid of plant origin and/or the contacting according to step (A0) proceeds by passing the gaseous composition through the liquid, particularly preferably by gas stripping or pervaporation. It is particularly preferred when the short-chain alcohol(s), for regeneration of the adsorber, is/are separately desorbed and collected. In addition, it is particularly preferred that the short-chain alcohols at least 90% by weight, particularly preferably at least 95% by weight, consist of ethanol. The incubation proceeds preferably at a temperature between 30 and 40° C. under anaerobic conditions. In addition, it is preferred that the steps (Z1), (A0), (A1), (A1.1) and/or (A2) are repeated at least once, preferably at least 5 times, wherein the at least one flavoring is recirculated to the liquid. It is particularly preferred if, by repetition of the individual steps, a continuous method procedure is achieved.

EXAMPLES

Hereinafter, the present invention is explained in more detail by recourse to examples. It is emphasized that the examples also merely possess illustrative character of particular embodiments, and in no way restrict the scope of the present application.

Example 1

Obtaining Hexanal from a Gas Stream

A gas stream consisting of 0.05% (mol/mol) hexanal, 0.95% (mol/mol) ethanol and 99% (mol/mol) nitrogen was passed through a glass column (Gassner Glastechnik, Germany) for 1 hour at 130° C., a gas volumetric flow rate of 3 l/min and a pressure of 1 bar, which column was packed with 400 g of zeolite moldings (ZSM-5, H-Form, $SiO_2/Al_2O_3$=1000; inert binder, manufacturer; Clariant AG). The concentrations of hexanal and ethanol in the gas stream were quantified by means of a gas chromatograph online after passage through the column.

Example 2

Use of Fermented Apple Juice 0.75 liter of a fermented apple juice which contains 65 g/l of ethanol was treated at 45° C. with an air stream of 0.75 l/min, By means of a diaphragm pump (KNF Neuberger, Germany) and a volumetric flow rate controller (Swagelok, Germany), the air stream was passed through a glass column (Gassner Glastechnik, Germany) which was packed with 400 g of zeolite moldings (ZSM-5, H-Form, $SiO_2/Al_2O_3$=1000; inert binder, manufacturer: Clariant AG). The gas stream that was depleted in ethanol was recirculated. After 48 hours, the experiment was terminated and the remaining ethanol concentration in the receiver was quantified by gas chromatography.

Example 3

Use of Fermented Orange Juice 0.5 liter of a fermented orange juice which contains 33 g/l of ethanol was treated at 35° C. with an air stream of 0.5 l/min, By means of a diaphragm pump (KNF Neuberger, Germany) and a volumetric flow rate controller (Swagelok, Germany), the air stream was passed through a glass column (Gassner Glastechnik, Germany) which was packed with 400 g of zeolite moldings (ZSM-5, H-Form, $SiO_2/Al_2O_3$=1000; inert binder, manufacturer: Clariant AG). The gas stream that was depleted in ethanol was recirculated. After 48 hours, the experiment was terminated and the remaining ethanol concentration in the receiver was quantified by gas chromatography.

The invention claimed is:

1. A method for obtaining flavorings comprising the step of
   (A0) enriching a gaseous composition with at least one flavoring by contacting the gaseous composition with a liquid containing the at least one flavoring;
   (A1) contacting the gaseous composition containing at least one flavoring with an adsorber, said adsorber comprising a molecular sieve having a pore diameter of at most 8 Å; and
   (A2) contacting the gaseous composition according to step (A1) with a liquid.

2. The method as claimed in claim 1, wherein the molecular sieve, at a temperature of about 40° C. and a pressure of about 1.013 bar absolute, binds at least two times the amount of short-chain alcohols in comparison with water from an aqueous alcoholic solution, when the aqueous alcoholic solution is an aqueous alcoholic solution of at least 50 g/l of the short-chain alcohol.

3. The method as claimed in claim 2, wherein at least 50% of the short-chain alcohols present in the aqueous alcoholic solution are bound to the molecular sieve.

4. The method as claimed in claim 1, said molecular sieve comprising a zeolite having an $SiO_2/Al_2O_3$ molar ratio of at least 50.

5. The method as claimed in claim 1, wherein the molecular sieve has a pore diameter in the range from 5 to 6.5 Å.

6. The method as claimed in claim 1, wherein the liquid containing the at least one flavoring is a liquid of plant origin.

7. The method as claimed in claim 6, wherein the liquid is fruit juice.

8. The method as claimed in claim 1 wherein the liquid is a fermented liquid.

9. The method as claimed in claim 1, wherein the liquid according to step (A2) is of plant origin, a fermented liquid or a mixture thereof.

10. The method as claimed in claim 1, wherein the liquid containing the at least one flavoring and the liquid according to step (A2) are the same or different liquids.

11. The method as claimed in claim 1, the method further comprising:
   (A1a) condensing the gaseous composition before the contacting with a liquid according to step (A2).

12. The method as claimed in claim 1, wherein the step (A0), (A1) and/or (A2) is repeated at least once.

13. A method for obtaining flavorings comprising the step of
   (A0) enriching a gaseous composition with at least one flavoring by contacting the gaseous composition with a first fermented fruit juice containing the at least one flavoring and comprising short-chain alcohols;
   (A1) contacting the gaseous composition containing at least one flavoring with an adsorber, said adsorber comprising a molecular sieve having a pore diameter of at most 8 Å, wherein said molecular sieve, at a temperature of about 40° C. and a pressure of about 1.013 bar absolute, binds at least two times the amount of short-chain alcohols in comparison with water from an aqueous alcoholic solution, when the aqueous alcoholic solution is an aqueous alcoholic solution of at least 50 g/l of the short-chain alcohol, said molecular sieve comprising a zeolite having an SiO2/Al2O3 molar ratio of at least 50; and
   (A2) contacting the gaseous composition according to step (A1) with a second fermented fruit juice, wherein the second fermented juice is the same or different than the first fermented juice.
   wherein at least 50% of the short-chain alcohols are bound to the molecular sieve; and
   wherein at least one of steps (A0), (A1) or (A2) is repeated at least once.

* * * * *